(12) United States Patent
Eder et al.

(10) Patent No.: US 11,449,071 B2
(45) Date of Patent: Sep. 20, 2022

(54) SYSTEM AND METHOD OF ROBOT CONTROL

(71) Applicant: Sony Interactive Entertainment Inc., Tokyo (JP)

(72) Inventors: Michael Eder, London (AT); Robert Keith John Withey, Bedfordshire (GB)

(73) Assignee: Sony Interactive Entertainment Inc., Tokyo (JP)

( * ) Notice: Subject to any disclaimer, the term of this patent is extended or adjusted under 35 U.S.C. 154(b) by 261 days.

(21) Appl. No.: 16/393,202

(22) Filed: Apr. 24, 2019

(65) Prior Publication Data

US 2019/0332122 A1 Oct. 31, 2019

(30) Foreign Application Priority Data

Apr. 30, 2018 (GB) .................................... 1807026

(51) Int. Cl.
*G05D 1/02* (2020.01)
*G05D 1/00* (2006.01)
*H04B 3/54* (2006.01)

(52) U.S. Cl.
CPC ......... *G05D 1/0276* (2013.01); *G05D 1/0022* (2013.01); *G05D 1/0274* (2013.01);
(Continued)

(58) Field of Classification Search
CPC .. G05D 1/0276; G05D 1/0022; G05D 1/0274; G05D 2201/0217; H04B 3/54; H04B 2203/5441
See application file for complete search history.

(56) References Cited

U.S. PATENT DOCUMENTS 6,175,860 B1 1/2001 Gaucher
2004/0256474 A1* 12/2004 Park ..................... G05D 1/0274
236/51
(Continued)

FOREIGN PATENT DOCUMENTS

CN 103684642 A 3/2014
EP 0869625 A1 10/1998
(Continued)

OTHER PUBLICATIONS

Examination Report for corresponding GB Application No. 1807026.8, 5 pages, dated Feb. 11, 2021.
(Continued)

*Primary Examiner* — Jeff A Burke
*Assistant Examiner* — Arslan Azhar
(74) *Attorney, Agent, or Firm* — Matthew B. Dernier, Esq.

(57) ABSTRACT

A system includes: a receiving unit configured to wirelessly receive a modulated electromagnetic signal leaked by a mains power line, the mains power line carrying a modulated alternating current signal, a demodulator configured to demodulate the modulated electromagnetic signal and extract one or more data signals from the demodulated electromagnetic signal, a processor configured to generate control data based on the one or more data signals, a control unit configured to control one or more actuators based on the control data, a processor configured to generate control data for controlling one or more actuators, and a modulator configured to modulate an alternating current signal of a mains power line using the generated control data to create a modulated alternating current signal, thereby causing the mains power line to leak a modulated electromagnetic signal comprising the control data that is wirelessly detectable.

15 Claims, 10 Drawing Sheets

(52) U.S. Cl.
CPC ....... *H04B 3/54* (2013.01); *G05D 2201/0217* (2013.01); *H04B 2203/5441* (2013.01)

(56) References Cited

U.S. PATENT DOCUMENTS

| | | | |
|---|---|---|---|
| 2007/0117589 A1 | 5/2007 | Sugiyama | |
| 2007/0250212 A1* | 10/2007 | Halloran | A47L 9/2894 700/245 |
| 2008/0183349 A1* | 7/2008 | Abramson | A01D 34/008 701/23 |
| 2009/0072954 A1* | 3/2009 | Kim | H04B 3/54 375/285 |
| 2010/0082193 A1* | 4/2010 | Chiappetta | G05D 1/0225 701/24 |
| 2010/0109907 A1* | 5/2010 | Sharma | H04B 3/54 340/870.02 |
| 2011/0037670 A1* | 2/2011 | Terahara | H01Q 13/203 343/737 |
| 2011/0076965 A1 | 3/2011 | Takahashi | |
| 2011/0202224 A1* | 8/2011 | Thompson | G05D 1/0295 701/26 |
| 2013/0029612 A1 | 1/2013 | Mochizuki | |
| 2015/0212500 A1* | 7/2015 | Akabane | G05D 1/0044 700/275 |
| 2016/0291595 A1* | 10/2016 | Halloran | A47L 9/2826 |
| 2017/0324445 A1* | 11/2017 | Tsujimoto | H04Q 9/00 |
| 2018/0081366 A1 | 3/2018 | Tan | |
| 2018/0148947 A1* | 5/2018 | Durvasula | E04H 4/1654 |

FOREIGN PATENT DOCUMENTS

| | | |
|---|---|---|
| ES | 2313833 A1 | 3/2009 |
| GB | 2235336 A | 2/1991 |
| GB | 2545301 A | 6/2017 |

OTHER PUBLICATIONS

Examination Report for corresponding GB Application No. 1807026.8, 4 pages, dated Jun. 24, 2020.
Combined Search and Examination Report for corresponding GB Application No. 1807026.8, 5 pages, dated Nov. 2, 2018.

* cited by examiner

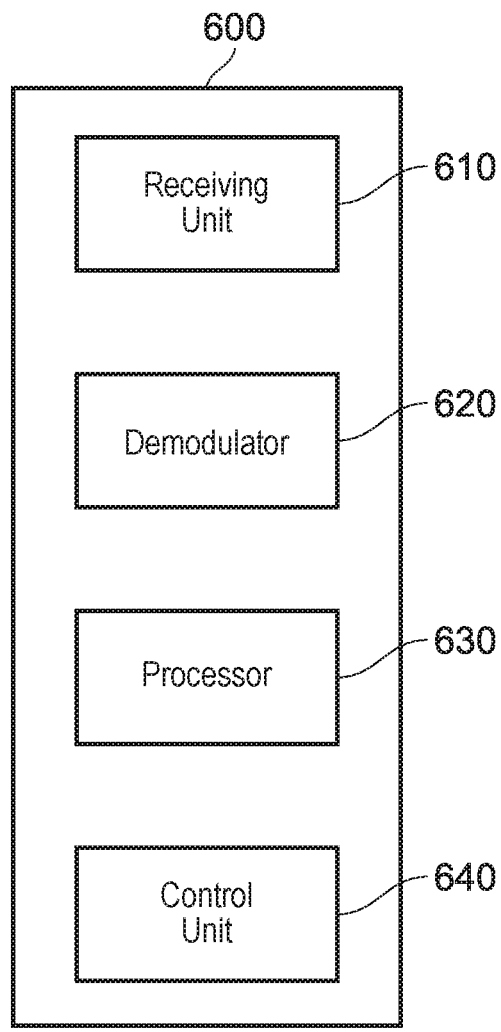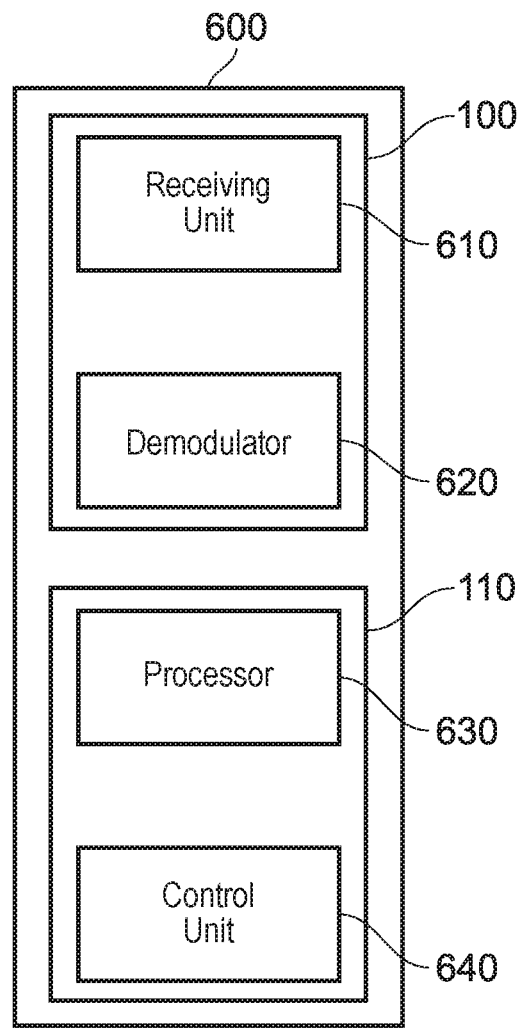
FIG. 6a
FIG. 6b

SYSTEM AND METHOD OF ROBOT CONTROL

BACKGROUND OF THE INVENTION

Field of the Invention

The present invention relates to a system and method of robot control, and more particularly to controlling navigation of a robot device in an indoor environment.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

The ability of a robotic device to navigate in its environment and avoid collisions has long been a pertinent consideration in the field. Limitations associated with navigation techniques have meant that movements of robotic devices within an environment have often been constrained to fixed paths, so as to avoid collisions which may cause harm to the robot or render the robot immovable. Even with recent advances in robotic technologies, techniques for guiding robotic devices often rely on vision based techniques using optical sensors mounted on the robot or within the environment in order to detect a proximity of an object or guide the robot along a predetermined path using painted lines. Alternative techniques have sought to embed a metal track within a flooring by up to a few centimetres so as to control the robot to follow a fixed path formed by the metal track. While such techniques have been widely used, the large number of permutations associated with guided robot movement in a home or office environment can often lead to unforeseeable occurrences where such techniques fail to provide accurate and reliable navigation.

Means and techniques to enhance the navigation of robotic devices for an indoor environment are therefore advantageous.

The present invention seeks to provide improved navigation for robotic devices for an indoor environment.

SUMMARY OF THE INVENTION

In a first aspect, there is provided a system for controlling a robotic device in an indoor environment in accordance with claim 1.

In another aspect, there is provided an entertainment system adapted to control a robot in an indoor environment in accordance with claim 11.

In another aspect, there is provided a method of controlling a robotic device in an indoor environment in accordance with claim 12.

In another aspect, there is provided computer software which, when executed by a computer, causes the computer to carry out a method of controlling a robotic device in an indoor environment in accordance with claim 15.

Further respective aspects and features of the invention are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIGS. 6a and 6b are schematic diagrams of alternative configurations of a system for controlling a robotic device in accordance with embodiments of the invention.

DESCRIPTION OF THE EMBODIMENTS

Figure 1:
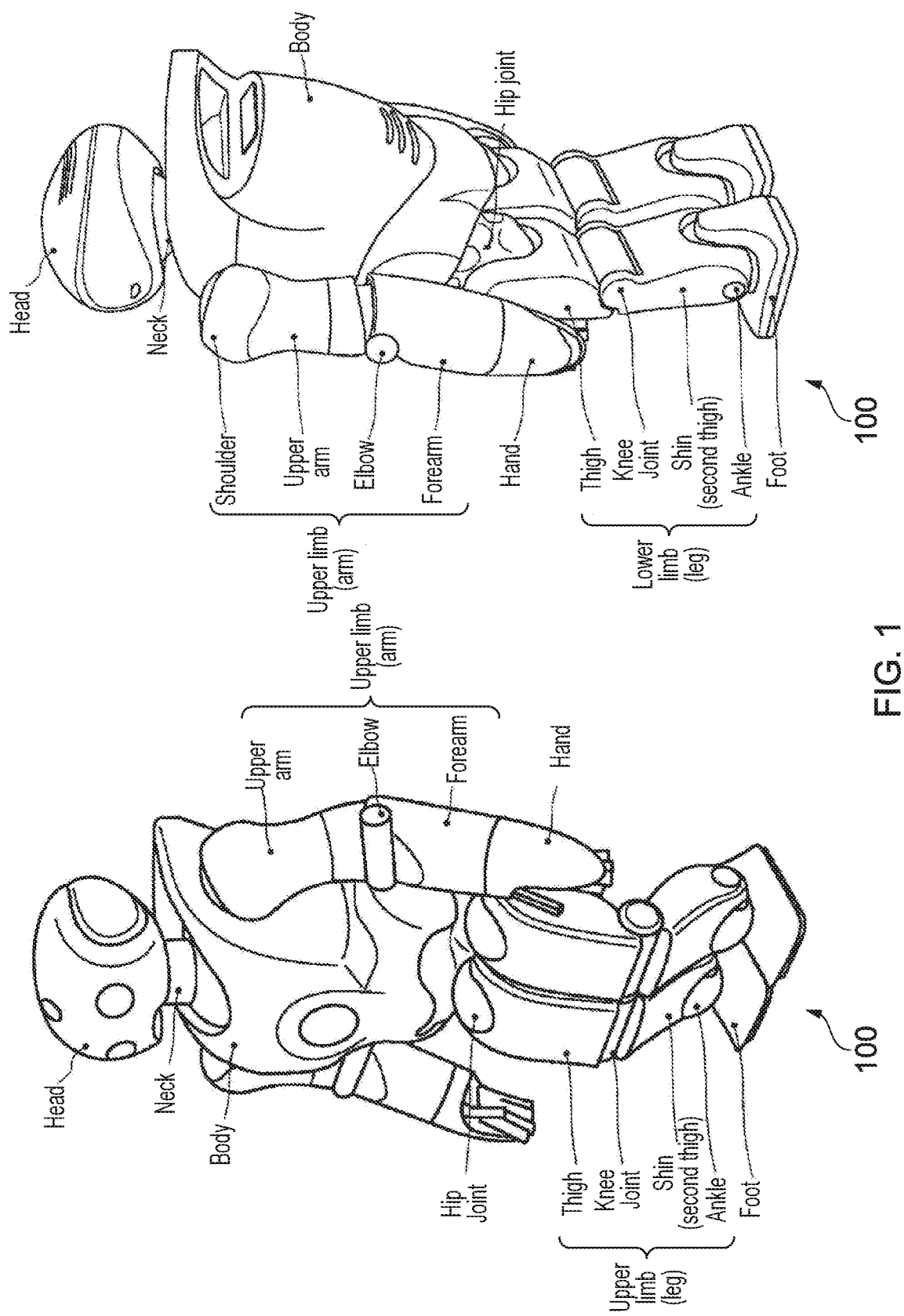
FIG. 1 is a schematic diagram showing front and rear elevations of a robot, in accordance with embodiments of the present invention.

Referring now to the drawings, wherein like reference numerals designate identical or corresponding parts throughout the several views, a robot platform 100 for implementing embodiments of the present invention may take the form of any suitable robotic device, or simulation of a robotic device, as applicable.

The terms "coupled" and "connected," along with their derivatives, may be used herein to describe structural relationships between components of the system for performing the operations herein. It should be understood that these terms are not intended as synonyms for each other. Rather, in particular embodiments, "connected" is used to indicate that two or more elements are in direct physical or electrical contact with each other while "coupled" is used to indicate two or more elements are in either direct or indirect (with other intervening elements between them) physical or electrical contact with each other, and/or that the two or more elements co-operate or communicate with each other (e.g., as in a cause an effect relationship).

In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

The robot platform may have any suitable physical features. Hence movement, where required, may be achieved by wheels, tracks, articulated limbs, internal mass displacement or any other suitable means. Manipulation, where required, maybe achieved by one or more of a mechanical hand, pincer or any other hooking or gripping system, such as a suction or electromagnetic attachment mechanism or a hook or clip, and any further optional articulation such as one or more jointed arms. Vision, where required, may be achieved by optical camera and/or infra-red camera/detector, mounted on the robot and/or located within the environment navigated by the robot. Other situational awareness systems such as ultrasound echolocation, or detection of metal tracks and/or electrically charged tracks, and proximity systems such as whiskers coupled to sensors, or pressure pads, may also be considered. Control of the robot may be provided by running suitable software instructions on a processor of the robot and/or a processor of a remote computer communicating with the robot, for example via a wireless protocol.

FIG. 1 illustrates front and rear views of an exemplary legged locomotive robot platform 100. As shown, the robot includes a body, head, right and left upper limbs, and right and left lower limbs for legged movement. A control unit 80 (not shown in FIG. 1) within the body provides a control system for the robot.

Each of the right and left lower limbs includes a thigh, knee joint, second thigh (calf/shin), ankle and foot. The lower limb is coupled by a hip joint to the bottom of the trunk. Each of the right and left upper limb includes an upper arm, elbow joint and forearm. The upper limb is coupled by a shoulder joint to each upper edge of the trunk. Meanwhile, the head is coupled by a neck joint near to the upper end centre of the trunk.

Figure 2:
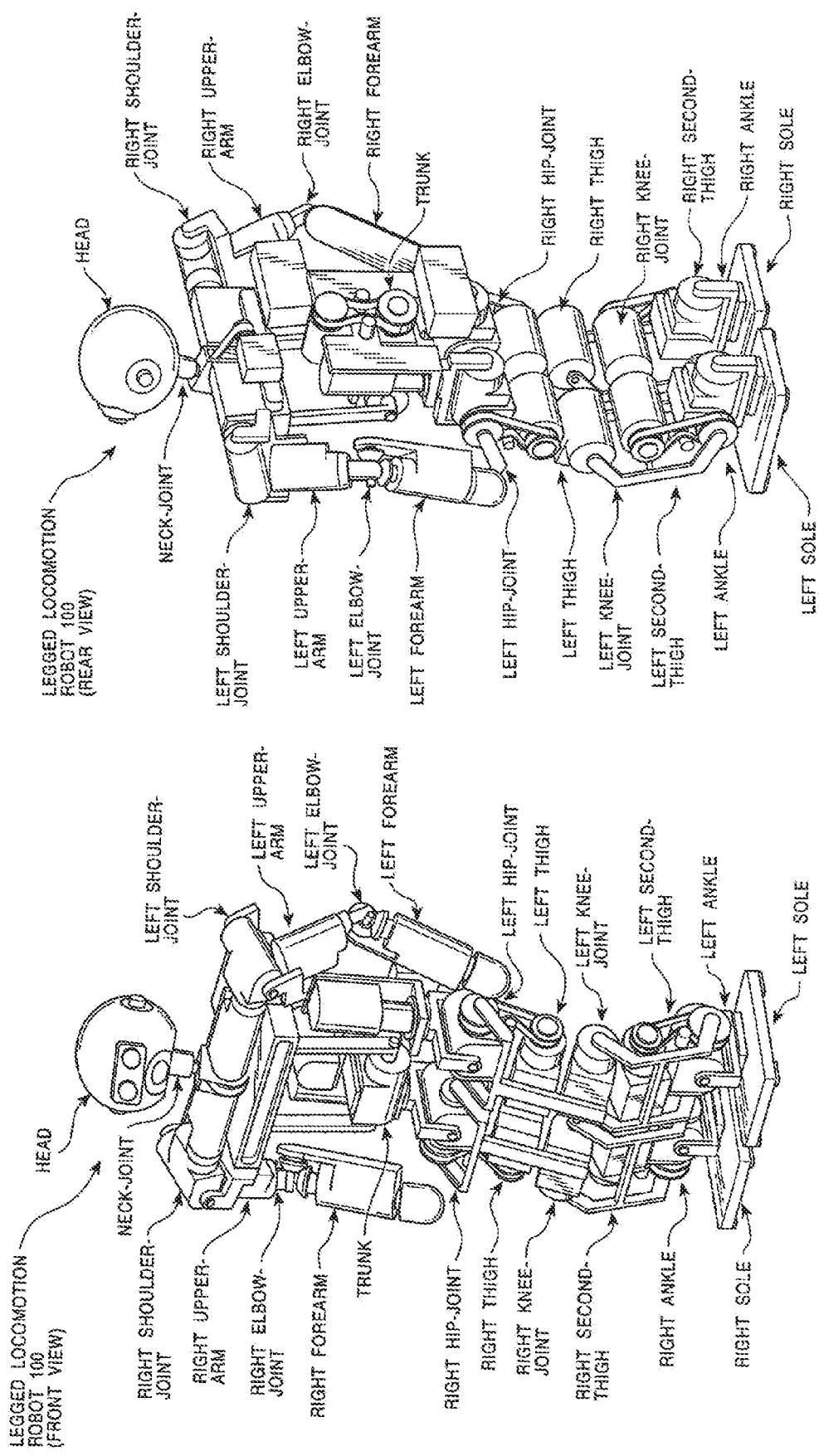
FIG. 2 is a schematic diagram showing front and rear elevations of points of articulation of a robot, in accordance with embodiments of the present invention.

FIG. 2 illustrates front and rear views of the robot, showing its points of articulation (other than the hands).

Figure 3:
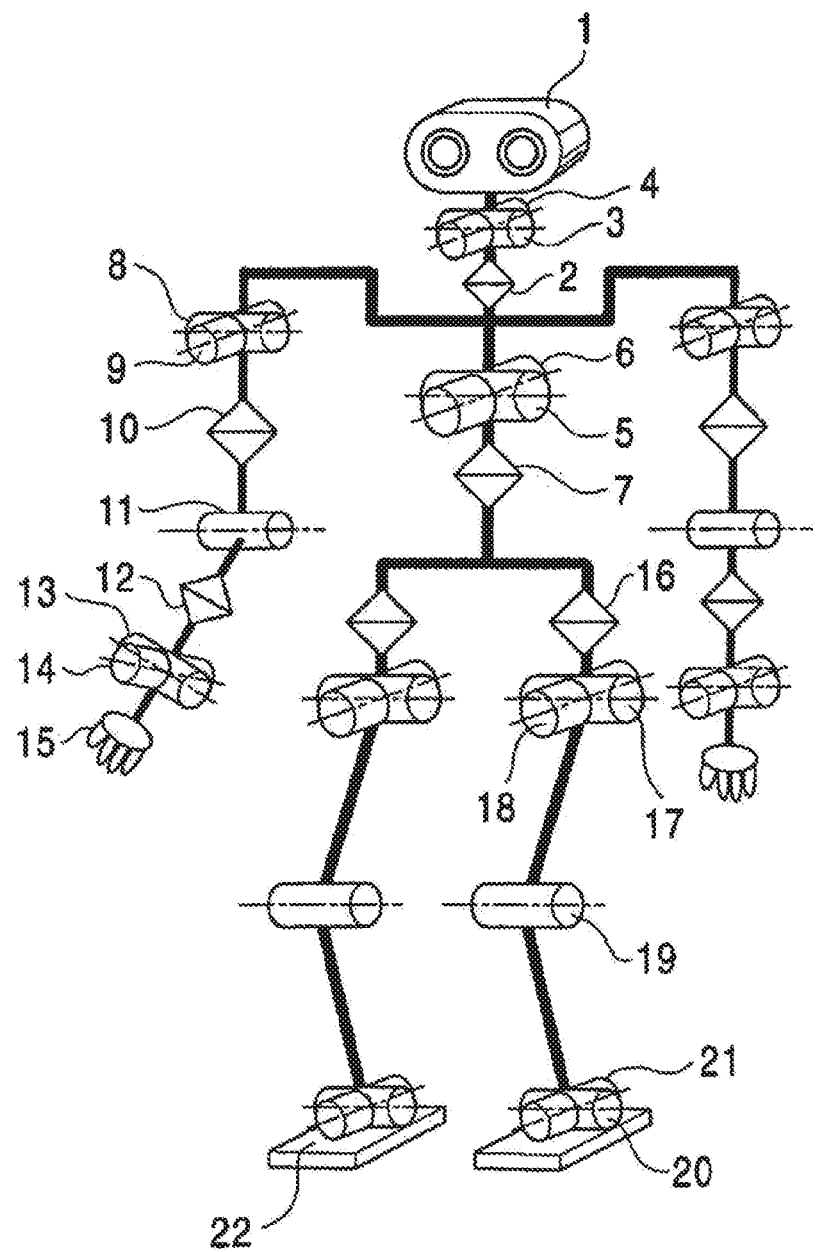
FIG. 3 is a schematic diagram illustrating degrees of freedom at respective points of articulation of a robot, in accordance with embodiments of the present invention.

FIG. 3 then illustrates the degrees of freedom available for each point of articulation.

Referring to these Figures, a neck joint for supporting the head 1 has 3 degrees of freedom: a neck-joint yaw-axis 2, a neck-joint pitch-axis 3, and a neck-joint roll-axis 4. Meanwhile each arm has 7 degrees of freedom; a shoulder-joint pitch-axis 8, a shoulder-joint roll-axis 9, an upper-arm yaw-axis 10, an elbow-joint pitch-axis 11, a forearm yaw-axis 12, a wrist-joint pitch-axis 13, a wrist-joint roll-axis 14, and a hand 15. Typically the hand 15 also has a multi-joints multi-degrees-of-freedom structure including a plurality of fingers. However, these are omitted for simplicity of explanation. The trunk has 3 degrees of freedom; a trunk pitch-axis 5, a trunk roll-axis 6, and a trunk yaw-axis 7. Each leg constituting the lower limbs has 6 degrees of freedom; a hip-joint yaw-axis 16, a hip-joint pitch-axis 17, a hip-joint roll-axis 18, a knee-joint pitch-axis 19, an ankle-joint pitch-axis 20, an ankle-joint roll-axis 21, and a foot 22. In the exemplary robot platform, the cross point between the hip-joint pitch-axis 17 and the hip-joint roll-axis 18 defines a hip-joint location of the legged walking robot 100 according to the embodiment. Again for simplicity it is assumed that the foot itself has no degrees of freedom, but of course this is non-limiting. As a result the exemplary robot 100 has 32 (=3+7×2+3+6×2) degrees of freedom in total. It will be appreciated however that this is merely exemplary, and other robot platforms may have more or fewer degrees of freedom.

Each degree of freedom of the exemplary legged locomotive robot platform 100 is implemented by using an actuator. For example, a small AC servo actuator that is directly coupled to a gear and that houses a one-chip servo-system may be used, although any suitable actuator may be considered, such as a linear servo, electroactive polymer muscle, pneumatic, piezoelectric, or the like.

It will be appreciated that any desired action that the robot platform is capable of may be implemented by control signals issued by a control system to one or more of the actuators of the robot (or to simulated actuators in a simulation, as applicable), to adjust the pose of the robot within its available degrees of freedom.

Figure 4:
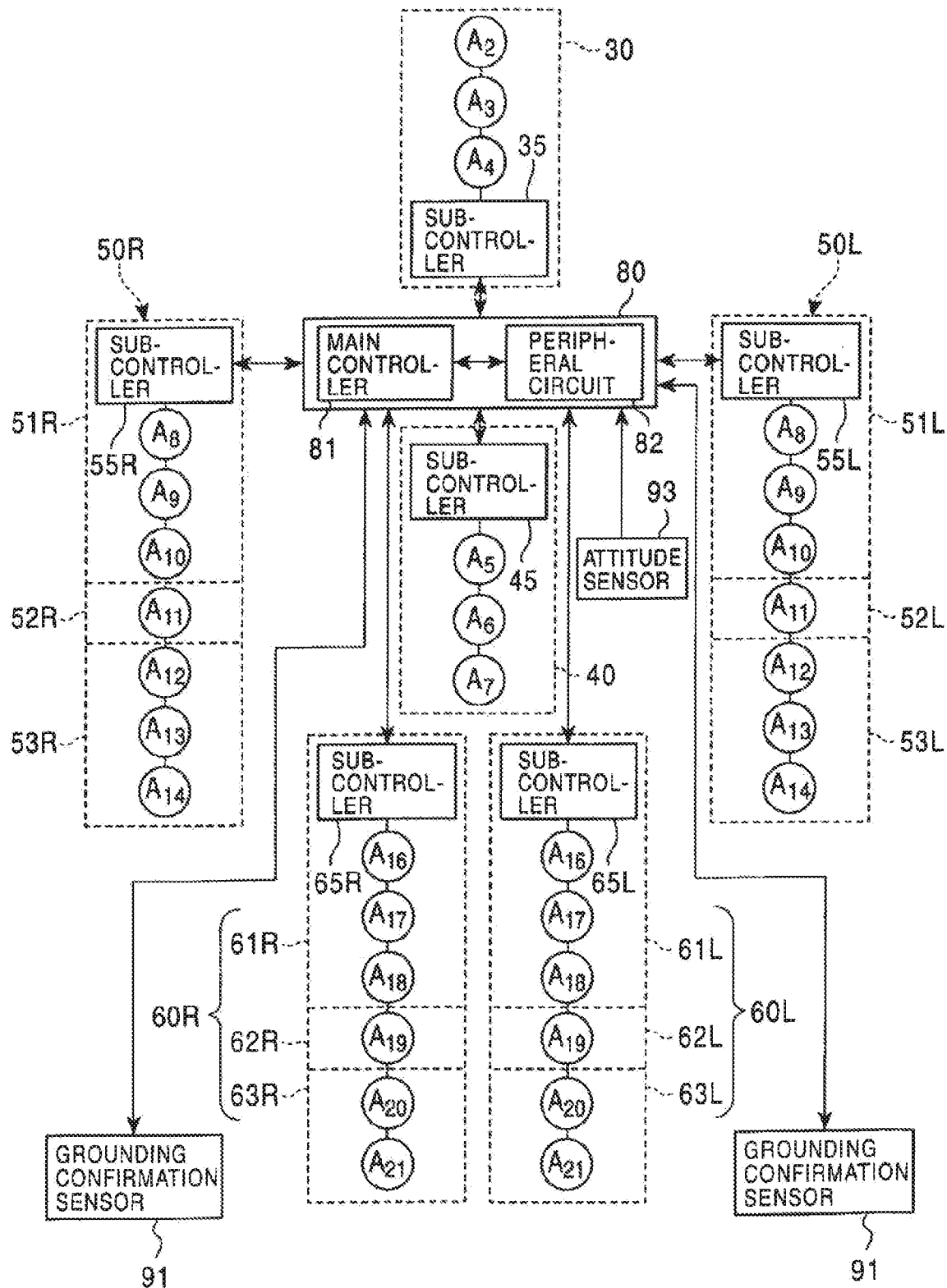
FIG. 4 is a schematic diagram of a control system for a robot, in accordance with embodiments of the present invention.

FIG. 4 schematically illustrates an exemplary control system for the robot platform 100.

A control unit 80 operates to co-ordinate the overall motion/actions of the robot. The control unit 80 has a main control unit 81 including main circuit components (not shown) such as a CPU (central processing unit) and a memory, and typically a periphery circuit 82 including an interface (not shown) for sending and receiving data and/or commands to and from a power supply circuit (not shown) and each component of the robot. The control unit may comprise a communication interface and communication device for receiving data and/or commands by remote-controlling. The control unit can be located anywhere suitable within the robot.

As shown in FIG. 4, the robot has logical units 30 (head), 40 (torso), and 50R/L and 60R/L each representing the corresponding one of four human limbs. The degrees-of-freedom of the robot 100 shown in FIG. 3 are implemented by the corresponding actuator within each unit. Hence the head unit 30 has a neck-joint yaw-axis actuator A2, a neck-joint pitch-axis actuator A3, and a neck-joint roll-axis actuator A4 disposed therein for representing the neck-joint yaw-axis 2, the neck-joint pitch-axis 3, and the neck-joint roll-axis 4, respectively. Meanwhile the trunk unit 40 has a trunk pitch-axis actuator A5, a trunk roll-axis actuator A6, and a trunk yaw-axis actuator A7 disposed therein for representing the trunk pitch-axis 5, the trunk roll-axis 6, and the trunk yaw-axis 7, respectively. Similarly the arm units 50R/L are broken down into upper-arm units 51R/L, elbow-joint units 52R/L, and forearm units 53R/L. Each of the arm units 50R/L has a shoulder-joint pitch-axis actuator A8, a shoulder-joint roll-axis actuator A9, an upper-arm yaw-axis actuator A10, an elbow-joint pitch-axis actuator A11, an elbow-joint roll-axis actuator A12, a wrist-joint pitch-axis actuator A13, and a wrist-joint roll-axis actuator A14 disposed therein for representing the shoulder-joint pitch-axis 8, the shoulder-joint roll-axis 9, the upper-arm yaw-axis 10, the elbow-joint pitch-axis 11, an elbow-joint roll-axis 12, the wrist-joint pitch-axis 13, and the wrist-joint roll-axis 14, respectively. Finally the leg units 60R/L are broken down into thigh units 61R/L, knee units 62R/L, and second-thigh units 63R/L. Each of the leg units 60R/L has a hip-joint yaw-axis actuator A16, a hip-joint pitch-axis actuator A17, a hip-joint roll-axis actuator A18, a knee-joint pitch-axis actuator A19, an ankle-joint pitch-axis actuator A20, and an ankle-joint roll-axis actuator A21 disposed therein for representing the hip-joint yaw-axis 16, the hip-joint pitch-axis 17, the hip-joint roll-axis 18, the knee-joint pitch-axis 19, the ankle-joint pitch-axis 20, and the ankle-joint roll-axis 21, respectively. Optionally the head unit 30, the trunk unit 40, the arm units 50, and the leg units 60 may have sub-controllers 35, 45, 55, and 65 for driving the corresponding actuators disposed therein.

Hence by issuing appropriate commands, the main controller (81) can control the driving of the joint actuators included in the robot 100 to implement the desired action. For example, the controller may implement a walking action by implementing successive phases, as follows:

(1) Single support phase (left leg) with the right leg off the walking surface;
(2) Double support phase with the right foot touching the walking surface;
(3) Single support phase (right leg) with the left leg off the walking surface; and
(4) Double support phase with the left foot touching the walking surface.

Each phase in turn comprises the control of a plurality of actuators, both within the relevant leg and potentially elsewhere in the robot, for example moving the opposing arm and/or attitude of the torso to maintain the centre of gravity of the robot over the supporting foot or feet.

Optionally, to detect the manner and/or extent of a physical interaction with an object and/or the environment, physical sensors may be provided.

Hence in the exemplary robot, the feet 22 have grounding detection sensors 91 and 92 (e.g. a proximity sensor or microswitch) for detecting the grounding of the feet 22 mounted on legs 60R and 60L respectively, and the torso is provided with an attitude sensor 93 (e.g. an acceleration sensor and/or a gyro-sensor) for measuring the trunk attitude. Outputs of the grounding detection sensors 91 and 92 are used to determine whether each of the right and left legs is in a standing state or a swinging state during the walking action, whilst an output of the attitude sensor 93 is used to detect an inclination and an attitude of the trunk. Other sensors may also be provided, for example on a gripping component of the robot, to detect that an object is being held.

The robot may also be equipped with sensors to provide additional senses. Hence for example the robot may be equipped with one or more cameras, enabling the control unit (or a remote system to which sensor-based data is sent) to recognise a user of the robot, or a target object for retrieval. Similarly one or more microphones may be provided to enable voice control or interaction by a user. Any other suitable sensor may be provided, according to the robot's intended purpose. For example, a security robot intended to patrol a property may include heat and smoke sensors, and GPS.

Hence more generally, a robot platform may comprise any suitable form factor and comprise those degrees of freedom necessary to perform an intended task or tasks, achieved by the use of corresponding actuators that respond to control signals from a local or remote controller that in turn operates under suitable software instruction to generate a series of control signals corresponding to a performance of the intended task(s).

In order to provide software instruction to generate such control signals, a robot software development system may be provided for developing control sequences for desired actions, and/or for developing decision making logic to enable the robot control system to respond to user commands and/or environmental features.

As part of this development system, a virtual robot (i.e. a simulation) may be used in order to simplify the process of implementing test software (for example by avoiding the need to embed test software within robot hardware that may not have simple user-serviceable parts, or to simulate an environment or action where a mistake in the software could damage a real robot). The virtual robot may be characterised by the dimensions and degrees of freedom of the robot, etc., and an interpreter or API operable to respond to control signals to adjust the state of the virtual robot accordingly.

Control software and/or scripts to use with such software may then be developed using, and to use, any suitable techniques, including rule based/procedural methods, and/or machine learning/neural network based methods.

Figure 5:
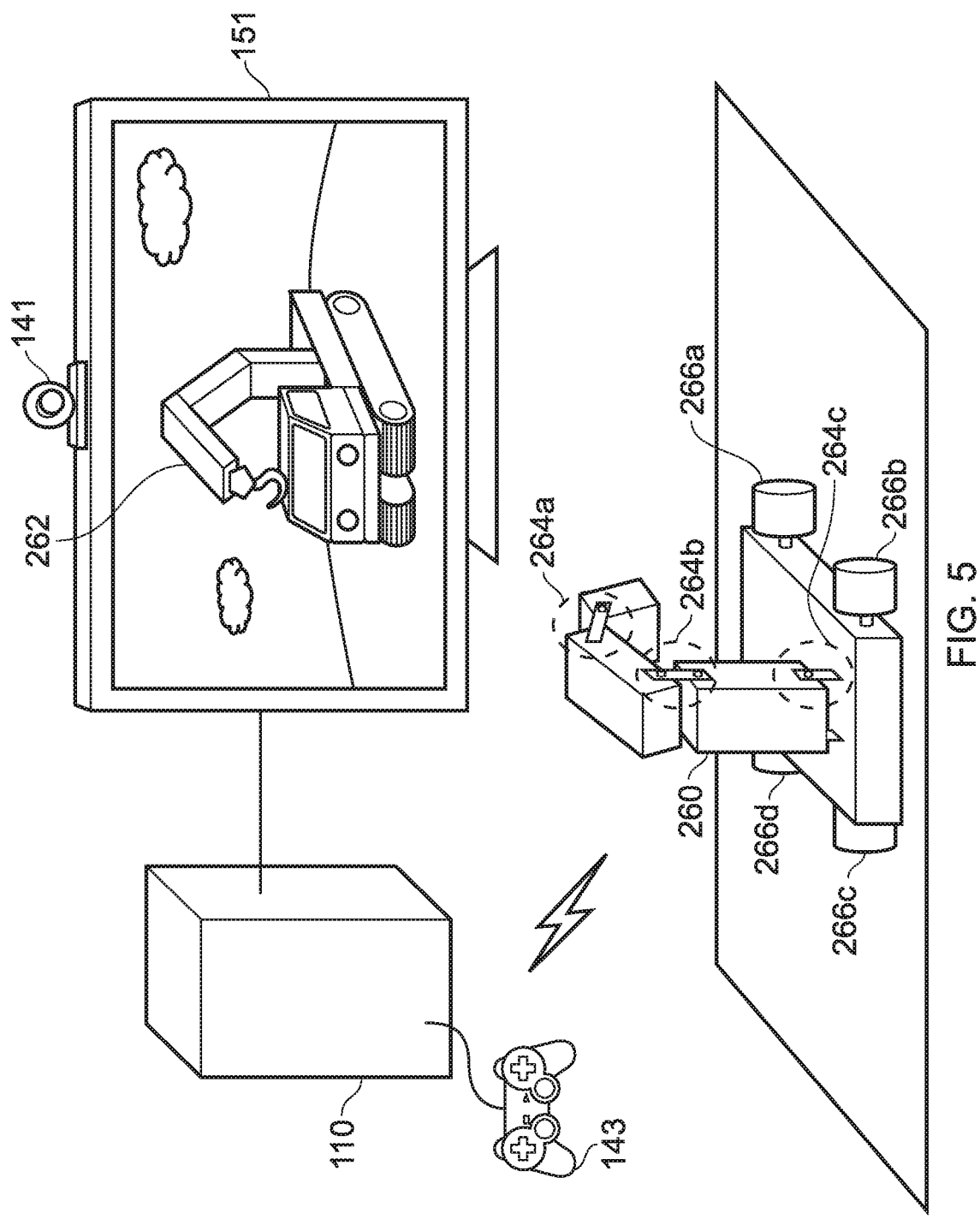
FIG. 5 is a schematic diagram of an interactive robot system in accordance with embodiments of the present invention.

Referring to FIG. 5, in an exemplary usage scenario a (toy) real robot crane 260 and a corresponding simulation (virtual robot crane 262) interact for entertainment purposes, for example mirroring each other's actions or behaving in a complementary manner, and/or using sensor data from the real or virtual robot to control actions of the other. The virtual robot may be graphically embellished compared to the real robot, for example having a face, or resembling an object or creature only approximated by the real robot.

In this example, the robot platform 260 has motorised wheels 266*a*-*d* and one articulated arm with actuators 264*a*-*c*. However it will be appreciated that any suitable form factor may be chosen, such as for example the humanoid robot 100 of FIG. 1, or a dog-shaped robot (not shown) or a spheroidal robot (not shown).

In FIG. 5, control of both the virtual and real robots is performed by a general purpose computer (110) operating under suitable software instructions, such as the Sony® PlayStation 4®. A user can interact with the PlayStation and hence optionally indirectly interact with one or both of the real and virtual robots using any suitable interface, such as a videogame controller 143. The PlayStation can detect the state of the real robot by receiving telemetry and other status data from the robot, and/or from analysis of an image of the real robot captured by a video camera 141. Alternatively or in addition the PlayStation can assume the state of the real robot based on expected outcomes of the commands sent to it. Hence for example, the PlayStation may analyse captured images of the real robot in expected final poses to determine its position and orientation, but assume the state of the robot during intermediate states such as transitions between poses.

In the example scenario, the user provides inputs to control the real robot via the PlayStation (for example indicating an amount and direction of travel with one joystick, and a vertical and horizontal position of the arm end with another joystick). These inputs are interpreted by the PlayStation into control signals for the robot. Meanwhile the virtual simulation of the robot may also be controlled in a corresponding or complementary manner using the simulation technique described above, according to the mode of play.

Alternatively or in addition, the user may directly control the real robot via its own interface or by direct manipulation, and the state of the robot may be detected by the PlayStation (e.g. via image analysis and/or telemetry data from the robot as described previously) and used to set a corresponding state of the virtual robot.

It will be appreciated that the virtual robot may not be displayed at all, but may merely act as a proxy for the real robot within a virtual environment. Hence for example the image of the real robot may be extracted from a captured video image and embedded within a generated virtual environment in an augmented reality application, and then actions of the real robot can be made to appear to have an effect in the virtual environment by virtue of those interactions occurring with a corresponding virtual robot in the environment mirroring the state of the real robot.

Alternatively, a virtual robot may not be used at all, and the PlayStation may simply provide control and/or state analysis for the real robot. Hence for example the PlayStation may monitor the robot via the camera, and cause it to pick up a ball or other target object placed within the camera's field of view by the user.

Hence more generally, a robot platform may interact with a general purpose computer such as the Sony® PlayStation 4 ® to obtain a series of control signals relating to setting a state of the robot, for the purposes of control by a user and/or control by the PlayStation to achieve a predetermined task or goal. Optionally the state, task or goal may be at least in part defined within or in response to a virtual environment, and may make use of a simulation of the robot.

In embodiments of the present invention, a robot platform such as the exemplary platforms 100 or 260 described previously herein may be used for the purposes of explanation, whilst it will be appreciated that any robot platform suited to the techniques and actions claimed herein below may be envisaged as being within the scope of the invention.

Power distribution systems exist throughout most developed countries for delivering electrical power to homes, offices and other premises via allocated power lines. Power line communication (PLC), also called mains communication or power line telecoms (PLT), is a communication technology that allows data to be carried along existing power lines so that data signals can be communicated to and from homes, offices and other establishments as well as to various locations throughout such buildings. Power line communication technology can thus enable data transfer at narrowband or broadband speeds through the existing electrical cables already installed in buildings by using modulation technology. Multiple applications can be carried over the electrical network using PLC such as Ethernet, Internet, Ultra Wide Band, Audio, HDMI, Triple-Play services and Smart Metering among others.

PLC arrangements typically operate by superimposing signals onto the sinusoidal alternating current (AC) signal carried by a mains power line so that the power line can be used to carry one or more data signals. A basic PLC system comprises a transmitter unit capable of superimposing one or more data signals onto the alternating current signal carried by a mains power line, and a receiver unit capable of extracting the one or more data signals from the modulated alternating current signal such that data can be communicated from the transmitter to the receiver using the power line. One or more coupling circuits (interface circuits/couplers) are used for coupling the transmitters and receivers of the PLC system to the mains power supply so as to enable the one or more data signals to be superimposed onto the waveform of the alternating current signal. In this way, PLC can be used to transmit data using mains electricity power lines that are ubiquitous in most developed countries, without the need to install additional cabling.

Electrical power transmission is typically performed using an alternating current signal with a frequency in the range 50-60 Hertz (Hz). A PLC arrangement typically superimposes one or more signals of higher frequency onto the 50-60 Hz alternating current signal of the mains power line so as to encode the alternating current signal with information of one or more data signals. In some cases, a modulated carrier frequency signal may be formed by superimposing one or more data signals onto a carrier frequency signal, and the modulated carrier frequency signal may be superimposed onto the AC signal carried by the mains power line so that data can be sent over the mains power line. In other words, a modulated carrier frequency signal comprising one or more data signals can be superimposed onto the AC signal of the mains power line. Other arrangements may implement orthogonal frequency-division multiplexing (OFDM) for achieving digital multi-carrier modulation for power line communication. As such, the alternating current signal of the mains power line can be modulated using one or more data signals such that the mains power line can carry a modulated alternating current signal comprising data of one or more data signals. In this way, a power line carrying a modulated alternating current signal can be used as a medium for transmitting data along existing power lines.

An alternating current signal has a periodic sinusoidal waveform which can be modified by modulating the waveform with one or more modulating signals. The alternating current signal therefore forms a carrier signal with a frequency in the range 50-60 Hz, and one or more data signals with a frequency greater than the carrier signal frequency can be superimposed on the carrier signal. This means that the alternating current signal can be modulated by superimposing data signals onto the alternating current signal and the modulated signal can thus be carried along the conducting wire of the power line in order to communicate the data to various points in the power distribution system.

Many internet service providers use existing power lines to carry data over long distances in what is called Broadband over Power Line (BPL). BPL can be used in order to deliver broadband data to homes and offices by superimposing a higher frequency data signal (1.6 to 250 MHz) onto the lower frequency AC signal in order to provide high data rates from 10-100 Mb/s. Narrowband power line communication (NB-PLC) is another form of PLC where an AC signal is modulated using a signal with a frequency in the range of 3 to 500 kHz, for providing data rates of up to a few thousand bits per second (CENELEC standards EN50065 and EN50065-1, for signals between 3 kHz and 148 kHz). Power lines carrying a modulated alternating current signal can thus be used to deliver data signals to homes and offices where a modem, in communication with the mains electricity, can demodulate the modulated alternating current signal to extract the data signals. As such, one or more data signals with a frequency greater than the frequency of the mains electricity AC signal can be carried along existing power cables and delivered to homes and offices.

Within a home or office environment, the power lines that are distributed throughout the walls, ceilings and/or floors of the building can also be used to carry the modulated alternating current signal, comprising the one or more data signals, to various locations (rooms) within the building. For example, a modem provided as part of a home router can be configured to modulate the alternating current signal of the mains power line in the home, such that the modulated alternating current signal comprises data from one or more data signals. Therefore, one or more data signals from the modem can be carried along the power cables existing within the walls, ceilings and/or floors of the building in order to carry the data to the various mains power outlets located around the house. For example, a power line communication modem (using the HomePlug Power Alliance® or Universal Powerline Association standards) connected to a router via an Ethernet® cable, can be plugged into a power outlet connected to the mains electricity supply. As such, the power line communication modem plugged into the power outlet can modulate the mains electricity AC signal with one or more data signals which can be carried along the power lines throughout the building and delivered to various rooms within the building.

An alternating current signal carried along a conducting wire of the power line causes electric charges in the conducting wire to accelerate and decelerate with a frequency corresponding to the alternating current signal frequency, such that the wire acts as an antenna and an electromagnetic signal is leaked (emitted or radiated) by the conducting wire. Consequently, if the mains power line is used to carry an alternating current signal to various points around a user's home, a wireless electromagnetic signal may be unintentionally leaked by the power line to the environment surrounding the power line. The electromagnetic signals leaked by a power line are an incidental product of using a conducting wire to carry an alternating current signal. The frequency of the electromagnetic waveform leaked by the conducting wire is determined by the frequency of the alternating current signal carried by the conducting wire. This means that when the power line carries a modulated alternating current signal, the power line will leak a modulated electromagnetic signal with properties characteristic of the modulated signal carried by the power line. Therefore, whilst carrying the modulated alternating current signal, an electromagnetic signal is leaked (emitted) by the power line having a frequency depending on the properties of the modulated alternating current signal.

Referring now to FIG. 6a, in embodiments of the disclosure a system 600 for controlling a robotic platform in an indoor environment comprises a receiving unit 610 of a robotic device 100 or 260 configured to wirelessly receive, from at least a portion of a mains power line, a modulated electromagnetic signal leaked by the mains power line, the mains power line carrying a modulated alternating current signal, a demodulator 620 of the robotic device 100 or 260 configured to demodulate the modulated electromagnetic signal and extract one or more data signals from the demodulated electromagnetic signal, a processor 630 configured to generate control data based on the one or more data signals, and a control unit 640, 80 configured to control one or more actuators of a robotic device based on the control data. It will be appreciated that the robotic device may operate in a similar manner to the exemplary robot platforms 100 or 260, to any applicable extent appropriate to the techniques and actions claimed herein below. The system 600 may be provided as part of the robotic device 100 or 260, such that the receiving unit 610, demodulator 620, processor 630 and control unit 640, 80 are all provided within the robotic device 100 or 260. Alternatively, the receiving unit 610 and the demodulator 620 may be provided as part of the robotic device 100 or 260, and the processor 630 and the control unit 640 may be provided as part of another device such as the general purpose computer 110 operating under suitable software instructions, as illustrated in FIG. 6b.

The system 600 can be configured to receive content comprising audio and video signals, and can transmit data via a wired or wireless communication such as one using the Bluetooth® link or the Wi-Fi® wireless link. The system 600 may communicate with respective devices as appropriate via an audio/visual input port, an Ethernet® port, a Bluetooth® wireless link, a Wi-Fi® wireless link, or one or more universal serial bus (USB) ports (not shown in FIGS. 6a and 6b).

In embodiments of the disclosure, the receiving unit 610 can be configured to wirelessly receive a modulated electromagnetic signal from at least a portion of the mains power line that carries the modulated alternating current signal. As discussed previously an AC signal can be modulated by superimposing one or more data signals onto the AC signal to modify the properties of the AC signal. Properties of an existing signal, such as amplitude and frequency, can be modified using a process of modulation in order to allow the existing signal to be used to carry information from one or more data signals. An analog signal, such as an alternating current signal carried by a mains power line or a high frequency carrier signal, can be modulated by performing one or more from the list consisting of: frequency modulation; amplitude modulation; phase modulation; polarization modulation; and digital modulation. As such, an alternating current signal can be modulated according to one or more of the above techniques to provide a modulated alternating current signal. Alternatively or in addition, a high frequency carrier signal can be modulated according to one or more of the above techniques and the alternating current signal carried by the mains power line may be modulated with the modulated high frequency carrier signal. It will be appreciated that digital modulation may be achieved by performing any of binary phase-shift keying (BPSK), frequency-shift keying (FSK), spread-FSK (S-FSK), amplitude shift-keying, orthogonal frequency division multiplexing (OFDM) and/or quadrature amplitude modulation.

Hence, the modulated electromagnetic signal wirelessly received by the receiving unit 610 may be a modulated electromagnetic signal leaked by at least a portion of a power line carrying the modulated alternating current signal. Alternatively or in addition, the receiving unit 610 can be configured to wirelessly receive a modulated electromagnetic signal, wherein the modulated electromagnetic signal is emitted by a light emitting device. For example, the power line carrying the modulated alternating current signal may deliver power to a light emitting device and the light emitting device may emit light (visible or infrared) having a modulation corresponding to the modulation of the modulated alternating current signal used to power the light emitting device. In this way, the light emitting device can emit a modulated electromagnetic signal that can be received by the receiving unit 610.

Frequency modulation of an AC signal can be performed by superimposing one or more data signals onto the AC signal, where the frequency of a data signal is greater than or less than the frequency of the carrier signal such that the frequency of the AC signal is modulated to represent the data signal added to the AC signal. For example, when AC signal has a frequency in the range 50-60 Hz, the AC signal can be modulated by superimposing one or more data signals having a frequency greater than the AC signal frequency onto the AC signal. In this way, the modulated AC signal comprises data of the one or more data signals superimposed onto the AC signal. In some examples, a first data signal with a first frequency and a second data signal with a second frequency may both be superimposed onto the AC signal. As such, the modulated AC signal may carry information concerning the first data signal and the second data signal.

Alternatively or in addition, an AC signal can be modulated by superimposing one or more data signals onto the AC signal, where a data signal has an amplitude that is different to the amplitude of the AC signal such that the modulated AC signal has an amplitude representing the data signal added to the AC signal. Alternatively or in addition, an AC signal can be modulated by superimposing one or more data signals onto the AC signal, where a data signal has a phase that is different to the phase of the AC signal such that the phase of the modulated AC signal is indicative of the phase of the data signal. Alternatively or in addition, the AC signal can be modulated by superimposing one or more data signals onto the AC signal, where a data signal has a polarization that is different to the polarization of the AC signal such that the polarization of the modulated AC signal is indicative of the polarization of the data signal. Alternatively or in addition, the AC signal can be modulated by superimposing one or more digital data signals onto the AC signal such that the modulated signal comprises information regarding a series of bits corresponding to the bits of the one or more digital data signals. For example, in amplitude-shift keying the modulated signal may represent the series of bits by abruptly shifting the amplitude of the modulated signal between a high amplitude and a low amplitude. It will be appreciated that the modulated signal may carry more than one modulated information stream based on any combination of the modulation techniques discussed above, and the above modulation techniques may be applied to other periodic waveforms such as a square waveform, sawtooth waveform, and/or triangle waveform.

As discussed previously, power transmission lines carry an alternating current signal with a frequency in the range of 50 to 60 Hz. A modem can be configured to modulate this alternating current signal so as to encode the alternating current signal with information regarding one or more data signals. This means that the signal used for delivering power throughout homes and offices can be modulated to carry information using the modem to perform modulation. The modem used to modulate the alternating current signal may be provided as part of a router located in the home or office environment, or as part of an internet service provider's server, for example.

In some examples, the receiving unit 610 of the robotic device 100, 260 can be configured to receive a modulated alternating current signal carried by a power line using a wired communication. For example, the receiving unit 610 may comprise an Ethernet® port and a Power over Ethernet (PoE) arrangement may be used such that the receiving unit 610 and the demodulator 620 receive electrical power via an Ethernet® cable. In this way, the receiving unit 610 may receive a modulated alternating current signal via the Ethernet® cable. Alternatively or in addition, the receiving unit 610 may be connected to a mains power outlet via a cable such as a USB cable or a dedicated power cable. Alternatively or in addition, the robotic device 100 or 260 may comprise one or more batteries used for delivering power to the one or more actuators.

In embodiments of the disclosure the receiving unit 610 can be configured to wirelessly receive, from at least a portion of a mains power line, a modulated electromagnetic signal leaked by the mains power line, the mains power line carrying the modulated alternating current signal. The receiving unit 610 may comprise one or more sensors (such as an electromagnetic field (EMF) meter) configured to wirelessly receive electromagnetic signals leaked by the power line carrying the modulated alternating current signal. The alternating current signal carried by the power line causes the power line to leak electromagnetic radiation such that the power line acts as a transmitter. In other words the alternating electric and magnetic fields associated with the signal carried by the power line results in the emission of an electromagnetic signal. The electromagnetic signal leaked by the power line has a frequency that is substantially the same as the frequency of the alternating current signal carried by the power line, and the electric field of the leaked electromagnetic signal results in a force ($F=qE$) on the electrons of the one or more sensors, which causes the electrons to flow in the one or more sensors of the receiving unit 610 thus creating a potential difference ($dV=dQ/C$) across a sensor which can be detected and measured. Hence, when the power line carries a modulated alternating current signal, the power line will leak a modulated electromagnetic signal which can be wirelessly received by the receiving unit 610. In this way, the receiving unit 610 is configured to wirelessly receive, from at least a portion of a mains power line, a modulated electromagnetic signal leaked by the mains power line, wherein the modulated electromagnetic signal comprises data from one or more data signals.

Alternatively or in addition, the receiving unit 610 can be configured to wirelessly receive a modulated electromagnetic signal, wherein the modulated electromagnetic signal is emitted by a light emitting device. The receiving unit 610 may comprise a plurality of electro-optical sensors configured to detect visible and/or infrared light emitted by the light emitting device. For example, the light emitting device may comprise a plurality of LEDs (visible and/or infrared), and the receiving unit 610 may comprise one or more charged coupled devices (CCD) configured to detect incident light and generate an electrical signal indicative of the properties of the incident light. The light emitted by the light emitting device may be visible and/or infrared and may be modulated using one or more data signals so that the light emitting device emits modulated light comprising data from the one or more data signals. The light emitting device may emit visible light with a modulation that cannot be observed by the human eye (invisible to the human eye), such that a user in the same room as the light emitting device is unaware of the modulation of the light emitted by the light emitting device. Alternatively or in addition, the light emitting device may emit modulated infrared light, in which case the user in the same room as the light emitting device is unaware of the presence of the infrared light.

In embodiments of the disclosure, the demodulator 620 in the robotic device 100 or 260 can be configured to demodulate the modulated electromagnetic signal and extract one or more data signals from the demodulated electromagnetic signal. The modulated electromagnetic signal can be wirelessly received by the receiving unit 610 of the robotic device 100, 260 and the modulated electromagnetic signal can be demodulated by the demodulator 620 provided as part of the robotic device 100 or 260. The demodulator 620 can separate the one or more data signals from the modulated electromagnetic signal so as to recover information from the modulated electromagnetic signal received by the receiving unit 610. As discussed previously, the modulated electromagnetic signal wirelessly received by the receiving unit 610 may be frequency modulated, amplitude modulated, phase modulated, polarisation modulated and/or digitally modulated. The demodulator 620 is thus configured to demodulate the modulated electromagnetic signal according to any on of the above discussed techniques in accordance with the modulation properties of the received electromagnetic signal. The demodulator 620 comprises circuitry configured to perform one or more from the list consisting of: frequency demodulation; amplitude demodulation; phase demodulation; polarisation demodulation; and digital demodulation. For example, the circuitry may perform demodulation and extraction of one or more data signals from the modulated electromagnetic signal by mixing the received modulated signal with a replica of the un-modulated signal. It will be appreciated that other techniques for demodulating a modulated signal are also considered.

In embodiments of the disclosure, the processor 630 can be configured to generate control data based on the one or more data signals extracted from the modulated electromagnetic signal. The processor 630 may be provided as part of the robotic device 100, 260 or may be provided as part of another device such as the general purpose computer 110, as illustrated in FIG. 6b. As such, the processor 630 is configured to receive the one or more data signals extracted by the demodulator 620 via a wired or wireless communication and the processor 630 can generate, based on the one or more data signals, data for controlling the robotic device 100, 260. The control data can be generated according to the properties of the one or more data signals extracted by the demodulator 630, and comprises data suitable for controlling the actuators of the robotic device 100, 260 to perform certain movements. In this way, control data can be generated in accordance with the received modulated electromagnetic signal so that control data for controlling a movement and/or a configuration of a robotic device in the indoor environment can be generated in response to the signal received by the receiving unit 610. The control data may comprise data indicating an intensity of the one or more data signals, wherein the intensity of a data signal indicates an approximate distance from the receiving unit 610 to the source responsible for emitting the modulated electromagnetic signal.

In embodiments of the disclosure, the control unit 640, 80 can be configured to control one or more actuators of a robotic device 100, 260 based on the control data generated by the processor 630. The control unit 640, 80 may be provided as part of the robotic device 100, 260, as illustrated in FIG. 4 and FIG. 6a, or may be provided as part of another device such as the general purpose computer 110, as illustrated in FIG. 6b. As such, the control unit 640, 80 is configured to receive the control data generated by the processor 630 via a wired or wireless communication and the control unit 640, 80 can control at least the movement and/or the configuration of the robotic device 100, 260 by controlling one or more actuators based on the control data. In some examples, a first control unit 640, 80 may be provided as part of the robotic device 100, 260 and a second control unit 640, 80 may be provided as part of the computer 110, and the second control unit 640, 80 may be configured to communicate the control data to the first control unit 640, 80 such that the first control unit 640, 80 can control the movement and the configurations of the robot.

The control unit 640, 80 can thus co-ordinate the overall motion/actions of the robotic device 100, 260 based on the control data. As discussed previously, the control unit 640, 80 may comprise a CPU (central processing unit) and a memory, and can control the driving of the joint actuators included in the robotic device 100, 260 to control the movements of the robotic device. For example, the control unit 640, 80 may control the one or more actuators of the robotic device 100 based on the control data to implement a walking action in response to the modulated electromagnetic signal. Alternatively, the control unit 640, 80 may control the one or more actuators so as to stop a walking action in response to the modulated electromagnetic signal. In some examples, movement of the robotic device 260 can be achieved by driving actuators associated with wheels 266a-d, and the control unit 640, 80 can control these actuators in response to the modulated electromagnetic signal to move the robotic device 260 or stop movement of the robotic device 260.

In embodiments of the disclosure, the control unit 640 can be configured to control the one or more actuators of the robotic device in response to the modulated electromagnetic signal in real time. The receiving unit 610 can receive the modulated electromagnetic signal, the demodulator 620 can demodulate the modulated electromagnetic signal and extract the one or more data signals, the processor 630 can generate the control data based on the one or more data signals, and the control unit 640 can control the one or more actuators of the robotic device based on the control data in real time. This means that the control unit 640 can control the one or more actuators of the robotic device in response to the modulated electromagnetic signal received by the receiving unit 610, and the robotic device can perform one or more actions and/or movements in real time accordance with the one or more data signals.

Figure 7:
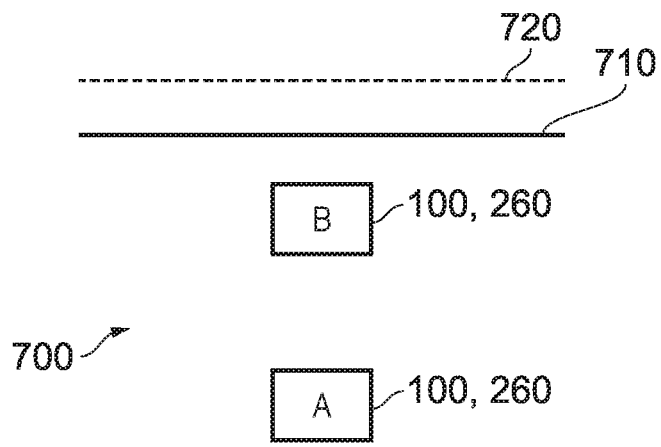
FIG. 7 is a schematic diagram illustrating positions of robot with respect to a powerline in a wall, in accordance with embodiments of the present invention.

In embodiments of the disclosure, the receiving unit 610 is configured to wirelessly receive, from at least a portion of the mains power line, the modulated electromagnetic signal leaked by the mains power line, the mains power line carrying the modulated alternating current signal, wherein the mains power line is positioned within at least one of a wall, a ceiling and a floor. FIG. 7 schematically illustrates an indoor environment 700 in which the robotic device 100, 260 can be controlled by the system 600. The robotic device 100, 260 can be controlled in the indoor environment 700 comprising the wall 710. The wall 710 comprises one or more mains power lines 720 carrying the modulated alternating current signal. Consequently, the power lines 720 leak the modulated electromagnetic signal, and the receiving unit 610 of the robotic device 100, 260 can wirelessly receive, from at least a portion of the mains power line, the modulated electromagnetic signal.

The power lines 720 in a home or office environment are typically positioned several centimetres from the surface of the wall 710. As such, the electromagnetic signals leaked by such power lines can penetrate through the walls 710 and be wirelessly received by the receiving unit 610 of the robotic device 100, 260 in a room within the indoor environment. When the robotic device 100, 260 is positioned at position A, as shown in FIG. 7, the magnitude (magnitude of the electric and magnetic fields and thus magnitude of the Poynting vector representing energy transfer per unit area) of the signal received by the receiving unit 610, from at least a portion of the mains power line, due to the modulated electromagnetic signal is small and may account for a very small proportion of the total signal received by the receiving unit (total signal received includes background electromagnetic signals). When the robotic device 100, 260 approaches the wall 710 comprising the power line 720 (position B in FIG. 7), the magnitude of the signal wirelessly received by the receiving unit 610 due to the modulated electromagnetic signal will increase. As such, as the robotic device 100, 260 approaches the wall 710 comprising a portion of the power line 720 the proportion of the signal received by the receiving unit 610 attributed to the modulated electromagnetic signal leaked by the portion of power line increases such that the properties of the modulated electromagnetic signal can be discerned from any other background electromagnetic signals that may exist in the indoor environment.

Figure 8:
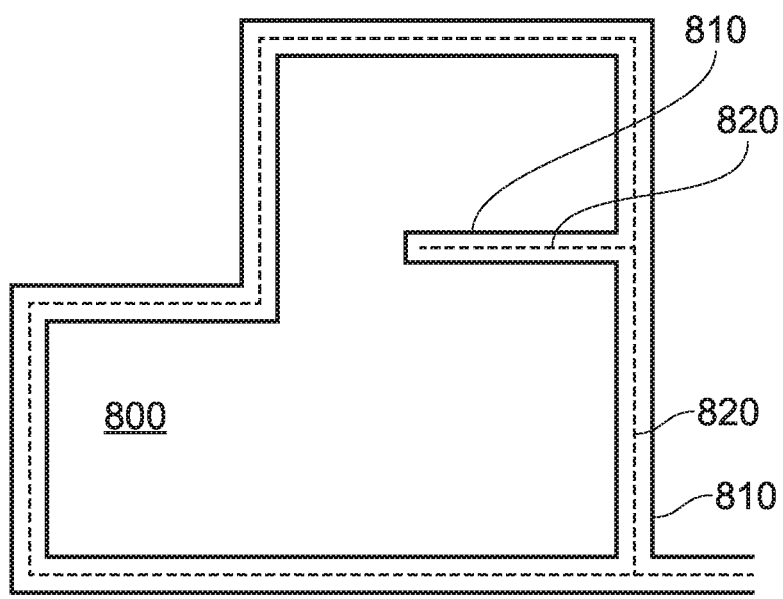
FIG. 8 is a schematic diagram of an indoor environment, in accordance with embodiments of the present invention.

In embodiments of the disclosure, the demodulator 630 is configured to demodulate the modulated electromagnetic signal and extract one or more data signals from the demodulated electromagnetic signal, wherein the one or more data signals comprise data indicating a position of the receiving unit 610 relative to one or more walls comprising one or more mains power lines. FIG. 8 schematically illustrates an indoor environment 800 in which the robotic device 100, 260 can be controlled by the system 600. The walls 810 of the indoor environment may comprise one or more power lines 820 for delivering power to power outlets located at various points around the indoor environment 800. When the robotic device 100, 260 moves around the indoor environment the robotic device 100, 260 may approach one of the walls 810 of the indoor environment 800 such that the magnitude of the signal received by the receiving unit 610 of the robotic device due to the modulated electromagnetic signal increases. The demodulator 620 can demodulate the modulated electromagnetic signal and extract one or more data signals from the demodulated electromagnetic signal. As such, the one or more data signals can be extracted from the signals received by the receiving unit 610, which may indicate the presence a wall 810 comprising at least one mains power line 820. The processor 630 can thus generate control data based on the one or more extracted data signals and the control unit 640 can be configured to control the one or more actuators of the robotic device in accordance with the presence of a wall 810 in the indoor environment 800.

The one or more of the data signals, which are extracted by the demodulator 620, may comprise data from which control data can be generated for controlling the one or more actuators of the robotic device 100, 260. The one or more data signals may comprise data such that the one or more actuators of the robotic device 100, 260 can be controlled by the control unit 640, 80 to either terminate a current movement of the robotic device, or terminate a movement of the robotic device in a direction towards the wall 810, or perform a rotation of the robotic device so that the robotic device subsequently moves in a direction away from the wall 810. In some examples, the one or more data signals extracted by the demodulator 620 can be used by the processor 630 to generate control data so as to control the robotic device 100, 260 to perform a 180 degree rotation such that the robotic device 100, 260 is controlled to be orientated in a direction facing away from the wall 810. Alternatively, control data may be generated to control the robotic device to perform a rotation in a manner such that the robotic device is orientated to face in a direction that is parallel to the wall 810, and the robotic device may subsequently move in a direction parallel to the wall.

The one or more data signals extracted from the demodulated electromagnetic signal can be analysed by the processor 630. A signal strength associated with a data signal can be used to estimate a distance of the receiving unit 610 in the robotic device from the power line 820 that emits the modulated electromagnetic signal comprising the data signal. In other words, the distance from the receiving unit 610 to the power line 820 in the wall 820 of the indoor environment 800 can be estimated by the processor 630 by analysing the properties of a data signal extracted from the modulated signal received by receiving unit 610. As the robotic device 100, 260 approaches the wall 810, the distance from the receiving unit 610 to the power line 820 in the wall decreases and the magnitude of a data signal extracted from the received modulated electromagnetic signal will increase. In some examples, the magnitude of a data signal extracted by the demodulator can be compared with one or more predetermined thresholds. In this case, when the data signal has a magnitude exceeding a first threshold (A) this may indicate that the receiving unit 610 of the robotic device 100, 260 is within a first predetermined distance (e.g. 40 cm) of the power line and when the data signal has a magnitude exceeding a second threshold (B) this may indicate that the receiving unit 610 is within a second predetermined distance (e.g. 20 cm) of the power line in the wall. Consequently, the processor 630 can generate the control data and the control unit 640, 80 can be configured to control the one or more actuators of the robotic device 100, 260 in accordance with the position of the receiving unit 610 of the robotic device 100, 260 relative to the wall 810 comprising the mains power line 820.

A plurality of predetermined respective thresholds may be provided that can be respectively compared with the magnitude of the one or more data signals extracted from the wirelessly received modulated electromagnetic signal. In this way, a first data signal with a magnitude exceeding a first predetermined threshold may indicate that the receiving unit 610 is within a first distance (X cm) of the power line. Alternatively or in addition, a second data signal with a magnitude exceeding a second predetermined threshold may indicate that the receiving unit 610 is within a second distance (Y cm) of the power line. Alternatively or in addition, the first data signal with a magnitude exceeding the second predetermined threshold may indicate that the receiving unit 610 is within a second distance (Z cm) of the power line. By comparing the plurality of respective thresholds with the magnitude of the one or more data signals, the distance from the receiving unit, which wirelessly receives the one or more data signals from at least the portion of the mains power line, can be determined based on the plurality of respective thresholds indicating a plurality of respective distances from the mains power line to the receiving unit. Alternatively, a robot may be adapted on the assumption of a known voltage, ampage, base frequency and modulation frequency to calculate a distance from the powerline using a predefined relationship to received signal strength, assuming for example a known transmission path typified by an initial wooden skirting board and then air. Such a relationship may also be obtained empirically. The robot can then estimate the distance to the powerline and similarly compare the estimated distance to any actionable threshold distance (for example for the purposes of collision avoidance, and/or to move parallel to the powerline for mapping purposes).

Alternatively or in addition, the modulated electromagnetic signal leaked by the power line 820 may comprise a plurality of data signals that can be extracted by the demodulator 620. The plurality of data signals may be extracted by the demodulator and the intensity of each data signal may be analysed to determine a position of the receiving unit 610 with respect to a wall 810 comprising a mains power line 820.

Referring to FIG. 8, in embodiments of the disclosure the modulated alternating current signal carried by the power line 820 comprises: an alternating current signal with a frequency in the range 50-60 Hertz; and one or more data signals with a frequency greater than the frequency of the alternating current signal. The alternating current signal of the power line 820 may be modulated using one or more data signals with a frequency in the range 1.8 to 250 MHz in order to achieve broadband data communication over the power line 720 (BPL). Alternatively, the power line 820 may be modulated using one or more data signals with a frequency in the range 3 to 500 kHz for narrowband power line communication (NB-PLC).

In embodiments of the disclosure, the processor 630 can be configured to generate the control data based on the one or more data signals and store the control data in association with data indicating a position of the receiving unit 610 at the time when the modulated electromagnetic signal associated with the one or more data signals is received. The robotic device 100, 260 can comprise one or more hardware motion detectors mounted anywhere within or on the robotic device 100, 260, such as one or more acceleration sensors and/or gyro-sensors (not shown in FIG. 6*a* or FIG. 6*b*). The one or more sensors may be provided as part of the robotic device 100, 260 and a position, orientation and/or velocity of the robotic device 100, 260 can be determined based on data provided by the one or more sensors. As such, the position, orientation and/or velocity of the receiving unit 610 of the robotic device can be determined based on the data provided by the one or more sensors. In this way, data indicating the position of the receiving unit 610 can be stored in a memory of the system 600 in association with the control data generated by the processor 630. The data indicating the position of the receiving unit 610 and the control data may each comprise timestamp data, and the position data and the control data can be stored in association with each other in accordance with the respective timestamp data. As such, the position of the receiving unit 610, and thus the robotic device 100, 260, at the time when the modulated electromagnetic signal is received can be determined based on the position data. The position data at the time of receiving the modulated electromagnetic signal can be stored in association with the control data generated based on the one or more data signals extracted from the modulated electromagnetic signal received by the receiving unit 610.

Figure 9:
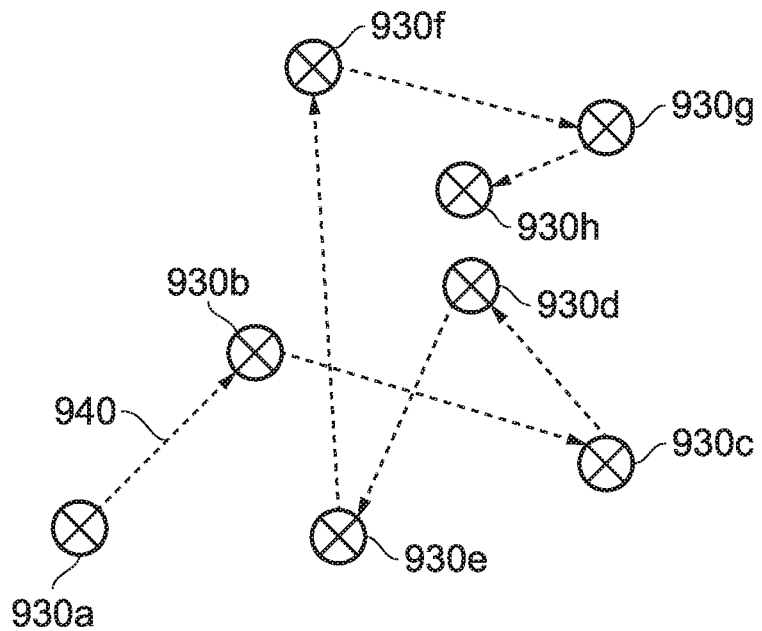
FIG. 9 schematically illustrates a plurality of receiving unit positions, in accordance with embodiments of the present invention.

The control data generated in accordance with the data signals extracted from the modulated electromagnetic signal can be stored in the memory in association with the position data of the receiving unit 610 at the time when the modulated electromagnetic signal is received. By storing the control data in association with the position data, the control data associated with a position may indicate the presence of a wall comprising one or more power lines at or near to the position. A plurality of positions of the receiving unit 610 in the indoor environment may be identified as positions where one or more data signals were extracted from the modulated electromagnetic signal indicating the presence of a wall comprising a power line. FIG. 9 schematically illustrates a plurality of receiving unit positions 930a-h at which the control data associated with each position 930a-h indicates the presence of a wall. As discussed previously, the properties of the data signals extracted by the demodulator can be used to infer a distance from the receiving unit 610 to a mains power line in a wall in the environment. The plurality of positions 930a-h in the environment can thus be identified, based on the stored data comprising the control data, as positions where the magnitude of the one or more data signals exceed a predetermined threshold which indicates the presence of a wall comprising one or more power lines. The dashed lines 940 indicate the path taken by the robotic device 100, 260 when moving in the indoor environment between the positions 930a-h.

Figure 10A:
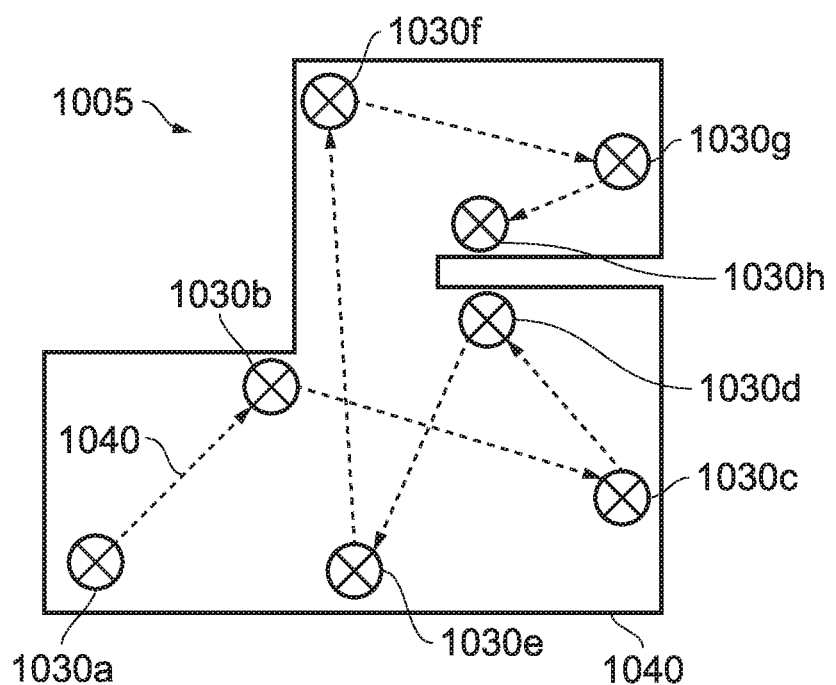
FIG. 10a schematically illustrates a map of an indoor environment, in accordance with embodiments of the present invention.

In embodiments of the disclosure, the processor 630 is configured to generate a map for the indoor environment based on the control data and the data indicating the position of the robotic device at the time when the modulated electromagnetic signal was received, to store the generated map, and to control the one or more actuators of the robotic device in accordance with the generated map, wherein the map includes one or more walls for the indoor environment. FIG. 10a schematically illustrates a map 1005 of an indoor environment generated by the processor 630 based on the control data and the data indicating the position of the robotic device. Using the position data and associated control data, the plurality of positions 1030a-h can be identified (the plurality of positions 1030a-h shown in FIG. 10a correspond directly to the plurality of positions 930a-h shown in FIG. 9). Based on the plurality of positions 1030a-h and the movements (dashed lines 1040 between the positions 1030a-h) of the robotic device 100, 260 undertaken between each position 1030a-h, the processor 630 can be configured to generate the map 1005 for the indoor environment 1000 by populating the map with one or more walls 1040. It will be appreciated that the movements shown by the lines 1040 serve to provide an example and movements of the robotic device between the positions 1030a-h may be different to that illustrated in FIGS. 9 and 10a.

The processor 630 can thus be configured to generate the map 1005 of the indoor environment based on the control data and associated data indicating the position of the robotic device 100, 260 and the map can be stored in the memory. The positions of the one or more walls 1040 of the map 1005 can be determined based on the positions 1030a-h and the paths undertaken between the positions. The orientation of a wall 1040 with respect to a position 1030a-h can be determined based on the properties of the one or more data signals extracted by the demodulator as the robotic device 100, 206 approaches the wall 1040. For example, for the receiving unit position 1030c, as shown in FIG. 10a, data regarding the direction of the path 1040 between positions 1030b and 1030c (obtained from data indicating the position of the robotic device) and the properties of the one or more data signals extracted by the demodulator can be analysed by the processor 630. As such, as the robotic device 100, 260 approaches a wall, the direction of the path 1040 and the properties of the one or more data signals can be analysed to identify the orientation of the power line and thus the wall 1040 with respect to the receiving unit 610. In some examples, the receiving unit 610 of the robotic device may comprise a plurality of sensors (such as a plurality of electromagnetic field (EMF) meters) and the orientation of the power line and thus the wall 1040 with respect to the receiving unit 610 can be determined by analysing the properties of the one or more data signals wirelessly received by the plurality of sensors. A comparison of the properties (e.g. magnitude) of the one or more data signals received by a first sensor with the properties of the one or more data signals received by a second sensor may be performed to determine the orientation of the power line and thus the wall 1040 with respect to the receiving unit 610. This may be performed by comparing the data received by the first sensor with the data simultaneously received by the second sensor. In this way, if the magnitude of a first data signal received by the first sensor is greater than the magnitude of a second data signal received by the second sensor, then an analysis of the signals can be used to identify that the first sensor is closer to the mains power line than the second sensor. In some cases, the data indicating the position of the robotic device, discussed previously, may be analysed together with the one or more data signals received by the first sensor and second sensor to determine the orientation of the power line and the wall with respect to the robotic device. The orientation of the one or more walls can thus be determined and intersection points for the one or more walls can be generated based on the position and orientation of the walls.

As discussed previously, the power lines in a typical home or office environment are typically positioned several centimetres from the surface of the wall 710. As such, the processor 630 can be configured to generate the map for the indoor environment to include one or more walls, wherein the walls are positioned closer to the position 1030a-h of the receiving unit 610 than the position of the power line that is indicated by the magnitude of the one or more data signals. In other words, the processor 630 can generate a map 1005 comprising one or more walls that are positioned so as to account for the depth of a power line within a wall. As such, the robotic device can navigate the indoor environment in accordance with the generated map 1005, and the one or more actuators of the robotic device can be controlled so that the robotic device 100, 260 is prevented from contacting the wall of the indoor environment.

In embodiments of the disclosure, the processor 630 can be configured to generate the map 1005 for the indoor environment, wherein the map includes one or more additional walls for the indoor environment representing virtual walls. The processor 630 can be configured to generate the map 1005 for the indoor environment, wherein the map 1005 includes one or more virtual walls positioned closer to the position 1030*a-h* of the receiving unit 610 than the position of the actual wall estimated (accounting for depth of power line in the wall) using the one or more data signals extracted from the modulated electromagnetic signal leaked by the power line in the wall. In this way, the map 1005 can be generated to include virtual walls that are positioned up to several centimetres closer to the receiving unit 610 of the robotic device 100, 260 than the actual position of the wall in the indoor environment. As such, the robotic device can navigate the indoor environment in accordance with the generated map 1005, and the one or more actuators of the robotic device can be controlled so that the robotic device 100, 260 may approach the virtual wall of the map without contacting an actual wall in the indoor environment.

In embodiments of the disclosure, the processor 630 can be configured to generate the map for the indoor environment such that the map includes one or more additional walls representing virtual walls, wherein a position of a virtual wall is determined according to the positions of the one or more walls of the indoor environment. In this way, the map 1005 can be generated to include the one or more walls corresponding to the one or more walls of the indoor environment that are identified based on the modulated electromagnetic signals received by the receiving unit 610, and one or more virtual walls can be included in the map in accordance with the positions of the walls of the indoor environment. This means that the map 1005 can be populated with one or more virtual walls with positions that do not correspond directly to the positions of the actual walls of the indoor environment.

Figure 10B:
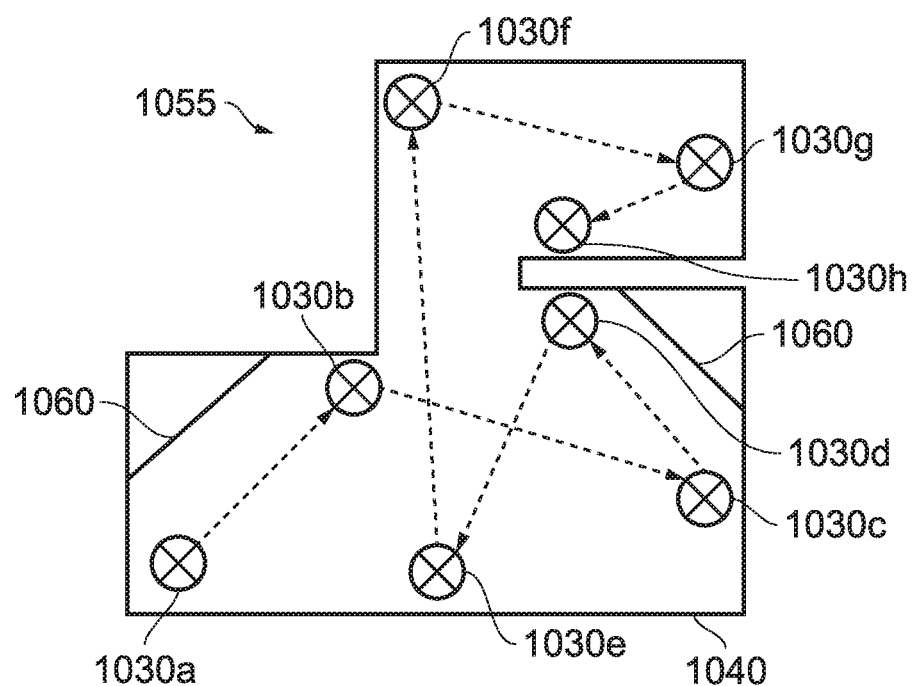
FIG. 10b schematically illustrates a map of an indoor environment additionally comprising virtual walls, in accordance with embodiments of the present invention.

FIG. 10*b* schematically illustrates a map 1055 of an indoor environment generated by the processor 630 which includes two virtual walls 1060 with positions determined according to the positions of the plurality of walls 1040 of the indoor environment. The map 1055 can be generated to include the virtual walls 1060 which can be positioned in accordance with the positions of the walls 1040 of the map 1055, so that the robotic device can be controlled in accordance with the map 1055 to prevent the robotic device from moving into certain regions within the indoor environment. In the example shown in FIG. 10*b*, the virtual walls 1060 are positioned according to the positions of the walls 1040 to prevent the robotic device 100, 260 from being manoeuvred into the corners formed where the respective walls meet. This advantageously prevents the robotic device 100, 260 from approaching the corners of the room where the geometry of the room may be more likely to result in the robot becoming confined to the corner region. Therefore, the virtual walls 1040 can thus be positioned based on the positions of the walls 1040 of the map to reduce the likelihood of the robotic device 100, 260 becoming trapped.

Alternatively or in addition, the processor 630 can be configured to generate, based on the map 1005 of the indoor environment, one or more virtual walls for forming one or more paths for guiding the robotic device in the indoor environment and the map 1005 can be populated with the one or more paths. The one or more actuators of the robotic device can be controlled by the control unit 640, 80 in accordance with the map 1005 comprising the plurality of paths, and the robotic device can be controlled to navigate the indoor environment by following one of the plurality of paths formed by one or more virtual walls. For example, the processor 630 may generate a path from the position 1030*a* to the position 1030*h* in accordance with the map 1005 in order to provide a path for navigating the indoor environment without colliding with the walls.

It will be similarly appreciated that any robot may use the techniques described herein to periodically communicate with a device having more processing power, memory, an/or networking capabilities than the robot. For example a Sony PlayStation 4 entertainment device may comprise the processor and optionally the control unit, and communicate via a powerline telecoms. The robot (for example a robot vacuum cleaner or mop) may then comprise a relatively simple processor and/or limited memory and/or networking capabilities. When the robot reaches a wall, it may receive instructions that are updated periodically, such as to recharge, or to stop operating because of a schedule set by an owner of the robot via an interface of the entertainment device. Similarly, the entertainment device may use its network capabilities to receive instructions transmitted by the user remotely (for example via a phone) to start or stop operation, or to specify an operation mode. The may then be conveyed to the robot when it is next within reception range of a power line.

Optionally the robot may receive signals during charging, when it may be in continuous proximity to an emitted mains signal (for example via a wired connection or via induction charging).

Further optionally, the robot may communicate back onto the mains powerline and thereon to the entertainment device, for example by modifying an antenna load receiving the leaked signal, in a manner similar to RFID tags. In this way, the entertainment device can respond to the status and/or activities of the robot as reported by it in order to generate new commands.

Figure 11:
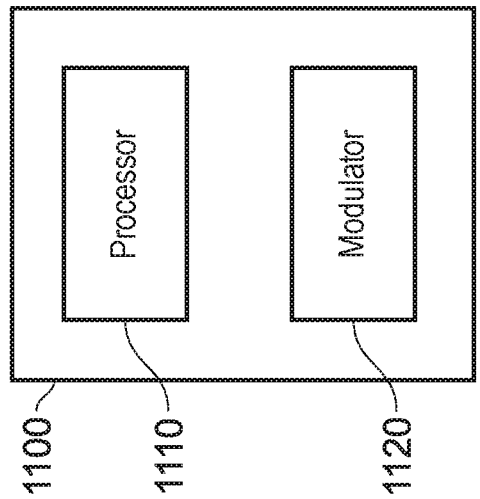
FIG. 11 schematically illustrates an entertainment system in accordance with embodiments of the present invention.

Referring now to FIG. 11, in embodiments of the disclosure an entertainment system 1100 adapted to control a robotic device 100, 260 in an indoor environment comprises a processor 1110 configured to generate control data for controlling one or more actuators of a robotic device 100, 260, and optionally a modulator 1120 configured to modulate an alternating current signal of a mains power line using the generated control data to create a modulated alternating current signal, thereby causing the mains power line to leak a modulated electromagnetic signal comprising the control data that is wirelessly detectable by a receiving unit of a controlled robotic device. It will be appreciated that the modulator may be a physically separate component to that comprising the processor; hence for example the processor may be provided by a videogame console, PC, or phone, whilst the modulation is provided by a powerline adapter operably in communication with the videogames console, PC or phone.

The entertainment system 1100 may thus for example comprise a general purpose computer 110, such as the Sony® PlayStation 4®, connected via wired means to the mains power supply. Alternatively or in addition, the entertainment system 1100 may comprise a router connected to the mains power supply via an Ethernet® cable (Power over Ethernet) and/or a dedicated power cable connected to a mains power outlet. The entertainment system 1100 may then further comprise a power line communication adapter (such as an adapter using the HomePlug Power Alliance® or Universal Powerline Association standard) that connects to a mains power outlet.

Figure 12:
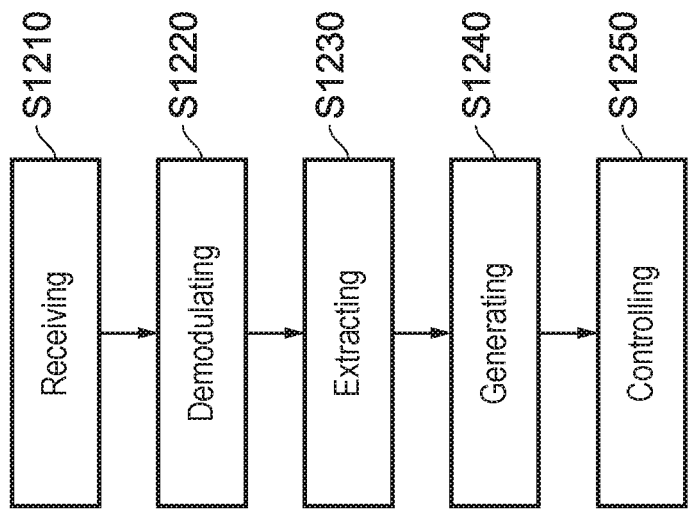
FIG. 12 is a flow diagram of a method of controlling a robotic device, in accordance with embodiments of the present invention.

Referring now to FIG. 12, in embodiments of the disclosure a method of controlling a robotic device in an indoor environment comprises:

a first step S1210 of wirelessly receiving, from at least a portion of a mains power line, a modulated electromagnetic signal leaked by the mains power line, the mains power line carrying a modulated alternating current signal;

a second step S1220 of demodulating the modulated electromagnetic signal;

a third step S1230 of extracting one or more data signals from the demodulated electromagnetic signal;

a fourth step S1240 of generating control data based on the one or more data signals; and a fifth step S1250 of controlling one or more actuators of a robotic device based on the control data.

Figure 13:
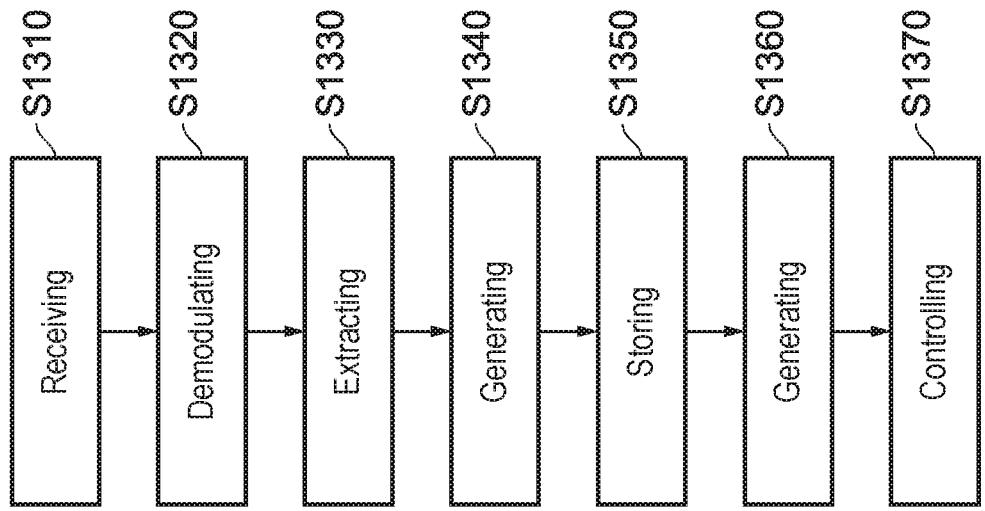
FIG. 13 is a flow diagram of a method of controlling a robotic device, in accordance with embodiments of the present invention.

Referring now to FIG. 13, in embodiments of the disclosure a method of controlling a robotic device in an indoor environment comprises:

a first step S1310 of wirelessly receiving, from at least a portion of a mains power line, a modulated electromagnetic signal leaked by the mains power line, the mains power line carrying a modulated alternating current signal;

a second step S1320 of demodulating the modulated electromagnetic signal;

a third step S1330 of extracting one or more data signals from the demodulated electromagnetic signal;

a fourth step S1340 of generating control data based on the one or more data signals;

a fifth step S1350 of storing the control data in association with data indicating a position of a robotic device at the time when the modulated electromagnetic signal was received;

a sixth step S1360 of generating a map for an indoor environment based on the control data and the data indicating the position of the robotic device at the time when the modulated electromagnetic signal was received; and a seventh step S1370 of controlling the one or more actuators of the robotic device in accordance with the generated map.

It will be apparent to a person skilled in the art that variations in the above method corresponding to operation of the various embodiments of the system as described and claimed herein are considered within the scope of the present invention. It will be appreciated that example embodiments can be implemented by computer software operating on a general purpose computing system such as a games machine or a computing system provided as part of a robotic device. In these examples, computer software, which when executed by a computer, causes the computer to carry out any of the methods discussed above is considered as an embodiment of the present disclosure. Similarly, embodiments of the disclosure are provided by a non-transitory, machine-readable storage medium which stores such computer software.

It will also be apparent that numerous modifications and variations of the present disclosure are possible in light of the above teachings. It is therefore to be understood that within the scope of the appended claims, the disclosure may be practised otherwise than as specifically described herein.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A system for controlling a robotic device in an indoor environment, comprising:
a receiving unit of a robotic device configured to wirelessly receive, directly from at least a portion of a mains power line, a modulated electromagnetic signal leaked by the mains power line, the mains power line carrying a modulated alternating current signal;
a demodulator of the robotic device configured to demodulate the modulated electromagnetic signal and extract one or more data signals from the demodulated electromagnetic signal;
a processor configured to generate control data based on the one or more data signals; and
a control unit configured to control one or more actuators of a robotic device based on the control data, and
wherein the modulated alternating current signal comprises:
an alternating current signal with a frequency in the range 50 to 60 Hertz; and
the one or more data signals with a frequency greater than the frequency of the alternating current signal, and
wherein the control unit is configured to control the one or more actuators of the robotic device in response to the modulated electromagnetic signal when a magnitude of the one or more data signals exceeds a threshold.

2. A system according to claim 1, wherein the mains power line is positioned within at least one of a wall, a ceiling and a floor.

3. A system according to claim 1, wherein the mains power line carries one or more from the list consisting of:
a frequency modulated alternating current signal;
an amplitude modulated alternating current signal;
a phase modulated alternating current signal;
a polarisation modulated alternating current signal; and
a digitally modulated alternating current signal.

4. A system according to claim 1, wherein the one or more data signals comprise data indicating a position of the receiving unit relative to one or more walls comprising one or more mains power lines.

5. A system according to claim 1, wherein the processor is configured to store the control data in association with data indicating a position of the receiving unit at the time when the modulated electromagnetic signal is received.

6. A system according to claim 5, wherein the processor is configured to generate a map for an indoor environment based on the control data and the data indicating the position of the robotic device at the time when the modulated electromagnetic signal was received, to store the generated map, and to control the one or more actuators of the robotic device in accordance with the generated map, wherein the map includes one or more walls for the indoor environment.

7. A system according to claim 6, wherein the map for the indoor environment includes one or more additional walls representing virtual walls.

8. A system according to claim 7, wherein a position of a virtual wall is determined based on a position of the one or more walls of the indoor environment.

9. A system according to claim 1, wherein the control unit is configured to control the one or more actuators of the robotic device in real time.

10. A system according to claim 1, wherein the one or more actuators operate to move the robotic device.

11. An entertainment system adapted to control a robotic device in an indoor environment, comprising:
- a processor configured to generate control data for controlling one or more actuators of a robotic device; and
- a modulator configured to modulate an alternating current signal of a mains power line using the generated control data to create a modulated alternating current signal,
- thereby causing the mains power line to leak a modulated electromagnetic signal comprising the control data that is directly wirelessly received by a controlled robotic device;
- wherein the modulated alternating current signal comprises:
- an alternating current signal with a frequency in the range 50 to 60 Hertz; and
- the one or more data signals with a frequency greater than the frequency of the alternating current signal, and
- wherein the processor is configured to control the one or more actuators of the robotic device in response to the modulated electromagnetic signal when a magnitude of the one or more data signals exceeds a threshold.

12. A method of controlling a robotic device in an indoor environment, comprising:
- wirelessly receiving, directly from at least a portion of a mains power line, a modulated electromagnetic signal leaked by the mains power line, the mains power line carrying a modulated alternating current signal;
- demodulating the modulated electromagnetic signal;
- extracting one or more data signals from the demodulated electromagnetic signal;
- generating control data based on the one or more data signals; and
- controlling one or more actuators of a robotic device based on the control data;
- wherein the modulated alternating current signal comprises:
- an alternating current signal with a frequency in the range 50 to 60 Hertz; and
- the one or more data signals with a frequency greater than the frequency of the alternating current signal, and
- wherein the controlling includes controlling the one or more actuators of the robotic device in response to the modulated electromagnetic signal when a magnitude of the one or more data signals exceeds a threshold.

13. A method according to claim 12, wherein the one or more data signals comprise data indicating a position of one or more walls of the indoor environment.

14. A method according to claim 12, further comprising:
- storing the control data in association with data indicating a position of a robotic device at the time when the modulated electromagnetic signal was received;
- generating a map for an indoor environment based on the control data and the data indicating the position of the robotic device at the time when the modulated electromagnetic signal was received; and
- controlling the one or more actuators of the robotic device in accordance with the generated map.

15. A non-transitory, computer-readable storage medium containing computer software which, when executed by a computer, causes the computer to carry out actions, comprising:
- wirelessly receiving, directly from at least a portion of a mains power line, a modulated electromagnetic signal leaked by the mains power line, the mains power line carrying a modulated alternating current signal;
- demodulating the modulated electromagnetic signal;
- extracting one or more data signals from the demodulated electromagnetic signal;
- generating control data based on the one or more data signals; and
- controlling one or more actuators of a robotic device based on the control data;
- wherein the modulated alternating current signal comprises:
- an alternating current signal with a frequency in the range 50 to 60 Hertz; and
- the one or more data signals with a frequency greater than the frequency of the alternating current signal, and
- wherein the controlling includes controlling the one or more actuators of the robotic device in response to the modulated electromagnetic signal when a magnitude of the one or more data signals exceeds a threshold.

* * * * *